Sept. 20, 1955 M. L. FLATA ET AL 2,718,561

MAGNETIC INSTRUMENT SHIELD SYSTEM

Filed March 27, 1951 3 Sheets-Sheet 1

Manuel L. Flata
Harold W. Bauman
INVENTORS
BY [signatures]
ATTORNEYS

Sept. 20, 1955 M. L. FLATA ET AL 2,718,561

MAGNETIC INSTRUMENT SHIELD SYSTEM

Filed March 27, 1951 3 Sheets-Sheet 2

Manuel L. Flata
Harold W. Bauman
INVENTORS

BY [signature]
[signature]

ATTORNEYS

Manuel L. Flata
Harold W. Bauman
INVENTORS
BY [signature]
[signature]
ATTORNEYS

United States Patent Office 2,718,561

Patented Sept. 20, 1955

2,718,561

MAGNETIC INSTRUMENT SHIELD SYSTEM

Manuel L. Flata and Harold W. Bauman, Chicago, Ill., assignors to Ampro Corporation, Chicago, Ill., a corporation of Illinois Application March 27, 1951, Serial No. 217,754

6 Claims. (Cl. 179—100.2)

This invention relates to shielding magnetic circuit elements of reproducing instruments from the effects of energization by stray magnetic fields, especially fields such as are produced by certain types of motor, as two-pole shaded pole induction motors.

Two-pole shaded pole induction motors are excellent for driving record bodies to move such bodies continuously and at constant speed past a transducer device that detects the recording of a signal on the body and translates it to an electrical value, usually a varying voltage. Several types of reproducing instruments have been developed, which include magnetic circuit elements that are subject to energization by stray magnetic fields to produce a spurious output component. Typical examples of such devices are magnetic recording and reproducing instruments that develop a reproduction signal from a variably magnetized traveling record body and disc reproducers of the variable magnetic reluctance type. In sound reproduction the effect of a stray motor field energizing such a magnetic circuit element appears as an objectionable hum of the frequency of the current powering the motor. Two-pole shaded pole induction motors are desirable, especially in inexpensive instruments, because of their excellent constant speed characteristic and their low cost. Since magnetic field intensity varies with distance from the magnetic poles in accordance with a square law, in a large installation a two-pole motor may be spaced from the magnetic circuit element sufficiently to prevent appreciable energization of such element by stray magnetic fields of the motor. In compact and readily portable instruments, however, the motor usually must be placed sufficiently close to the magnetic circuit element to result in substantial energization of the latter.

The present invention is directed to provision of a very effective shielding system that may be positioned between a record body-driving two-pole shaded pole induction motor and a magnetic circuit element that is spaced from the motor insufficiently to prevent its energization by the motor stray field in the absence of the shielding system. It is well known that a most efficient shielding system for a magnetic field comprises a laminated arrangement, of which alternate laminations are of high and low magnetic permeability. The system of the present invention is of this type. In order to economize on weight and cost of material, the shielding system herein disclosed makes use almost entirely of structural parts and elements of the instruments that are required for purposes other than shielding. The material of which these elements and parts respectively are made is selected to provide in effect the highly effective alternate laminations of high and low magnetic permeability.

It will be evident that the invention is useful for both recording and reproducing and particularly in an instrument for accomplishing both these functions, although, in recording, the energization of the magnetic circuit element ordinarily is insufficient to impose on the record a recording of the spurious energization.

Figure 1:
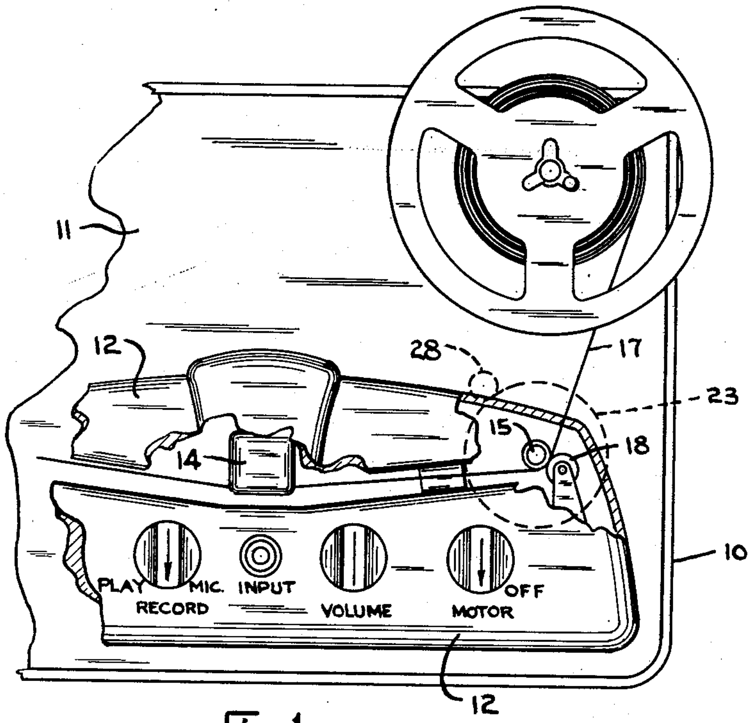
Figure 1 is a fragmentary top plan of a magnetic tape recording and reproducing instrument.
Figure 2:
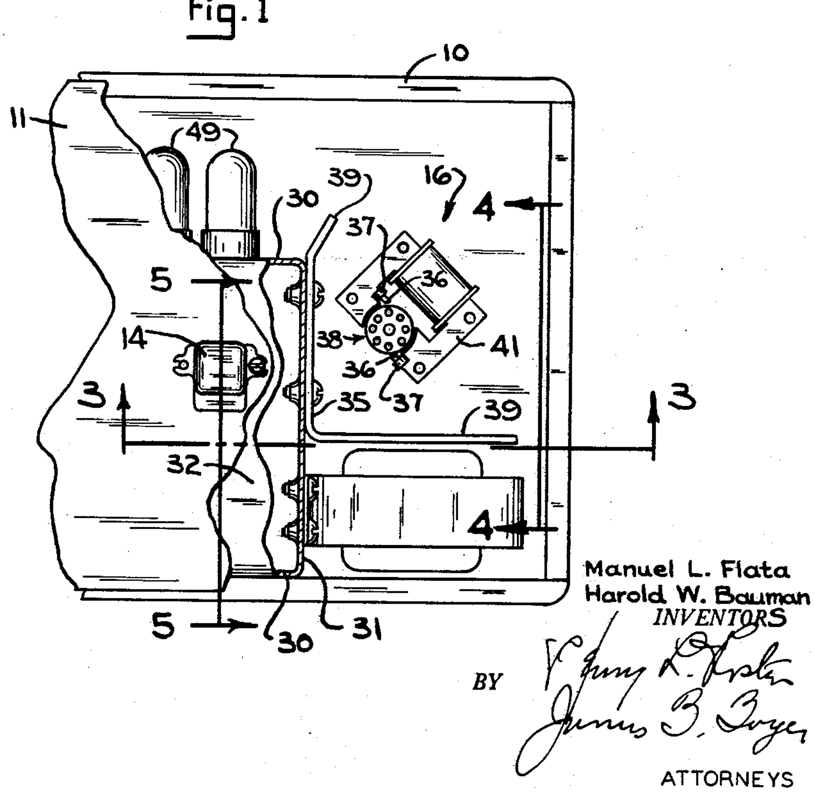
Figure 2 is a similar fragmentary top plan which is broken to disclose internal arrangements embodying the invention.

Describing the drawings in detail, and as shown in Figure 1, the instrument comprises a casing having side walls 10 and a cover plate 11. A hood 12 is mounted on cover plate 11 to overlie the tape form record body handling mechanism. This hood is shown partly broken away in Figure 1, and Figure 2 discloses part of the instrument with the hood removed. A recording and reproducing head 14 is supported on cover plate 11, the head being shown as of a conventional type. A capstan 15 is supported above the surface of cover plate 11 and is driven at constant speed by a motor 16 to drive the record body 17 which is engaged between its surface and a retractable pinch roll 18. The tape handling mechanism is fully described and claimed in the applications of Edmund Barany, Melvin Sackter and Harold W. Bauman, Serial Number 194,918, filed November 9, 1950, and of Harold W. Bauman, Serial Number 194,914, filed November 9, 1950.

The instrument is shown as being of a compact, small, and readily portable type which involves the limitation of the dimensions of the case to minimums. For economy motor 16 is a two-pole shaded pole induction motor and its function is to rotate capstan 15. Due to the limitation of the instrument to compact form, motor 16 is mounted in a location that is sufficiently close to that of head 14 as to energize the magnetic circuit element of the latter. The motor mounting and record driving mechanism is fully disclosed and claimed in the application of Edmund Barany and Melvin Sackter, Serial Number 196,134, filed November 9, 1950. The motor mounting includes a bracket support structure comprising an upper plate 20 that is secured to the underside of cover plate 11, and a U-shaped plate 21 is secured to plate 20 and has a reach 22 that is spaced from plate 20. A rotatable assembly, including roller 15, a flywheel 23, and a pulley 24, is mounted in the structure provided by plates 20, 22 with the flywheel and pulley positioned between those plates. A motor mounting plate 25 is pivotally supported by and below plate 22 by means of a system of spacer collars and bolts 26 as described in the above-identified Barany and Sackter applications. The motor 16 is suspended from plate 25 by a system of grommets 27. Motor 16 has a rotatable spindle 28 that projects through holes in plates 22 and 25 that are displaced from alignment with the openings in plates 20 and 11 through which capstan 15 projects, and contacts the rubber-tired periphery of flywheel 23. A spring 29 biases the motor about its pivot support to insure driving friction contact between spindle 28 and the periphery of the flywheel structure.

The instrument also includes an electronic system which, in the particular instrument being described, is capable of selective operation as a recording amplifier and high frequency bias device, or as an audio frequency reproducing amplifier. In the former type of operation head 14 is energized by the amplifier output and acts as a recording head to variably magnetize record body 17, and in the latter type of operation the voltage developed by head 14 acting as a pickup head is applied to the amplifier input and the amplifier drives a speaker. The amplifier includes a box-like chassis of side walls 30, an end wall 31 and a top wall 32. The chassis walls are made of the standard hard aluminum alloy that is used by electronic industries for chassis purposes.

Figure 4:
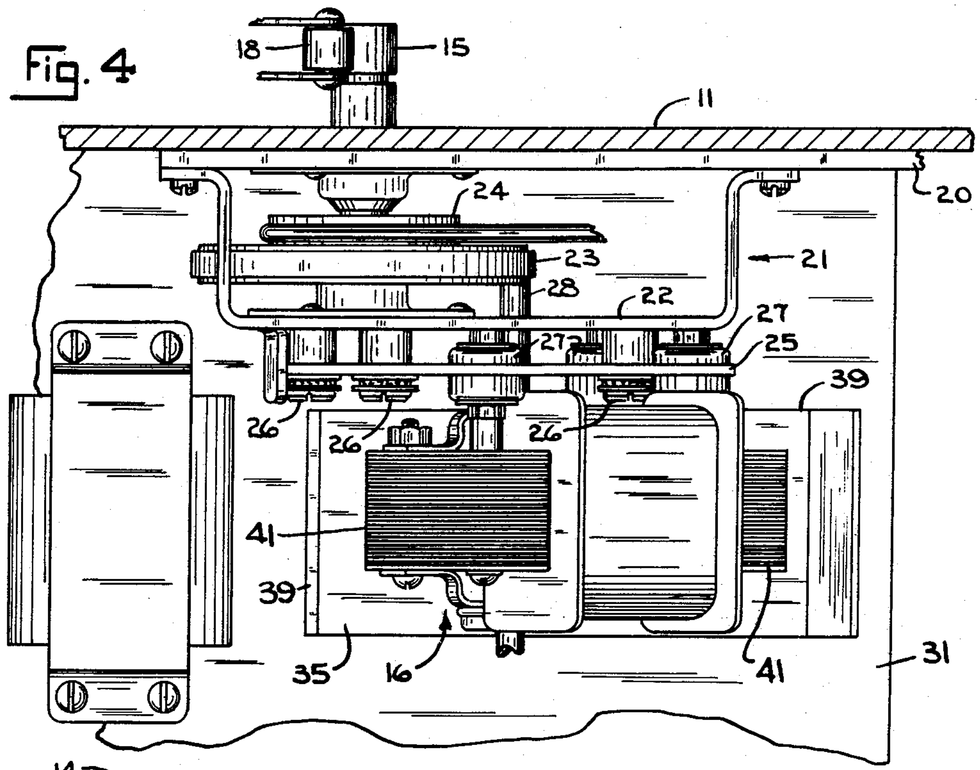
Figure 4 is a section on line 4—4 of Figure 2.
Figure 3:
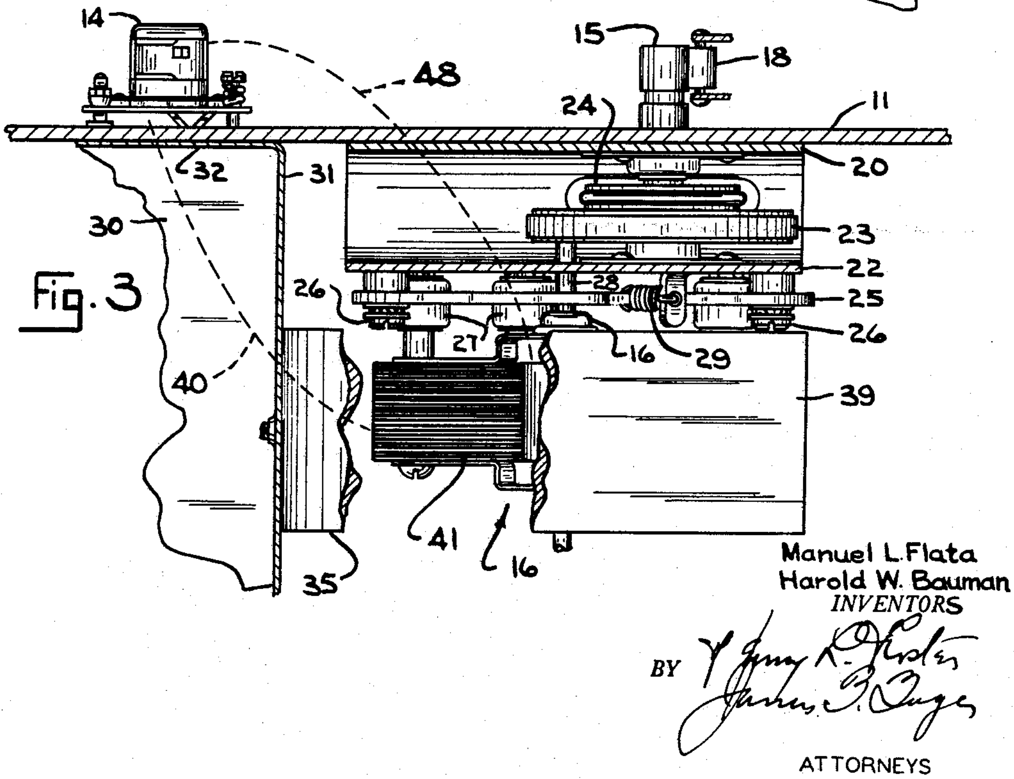
Figure 3 is a section on line 3—3 of Figure 2.
Figure 5:
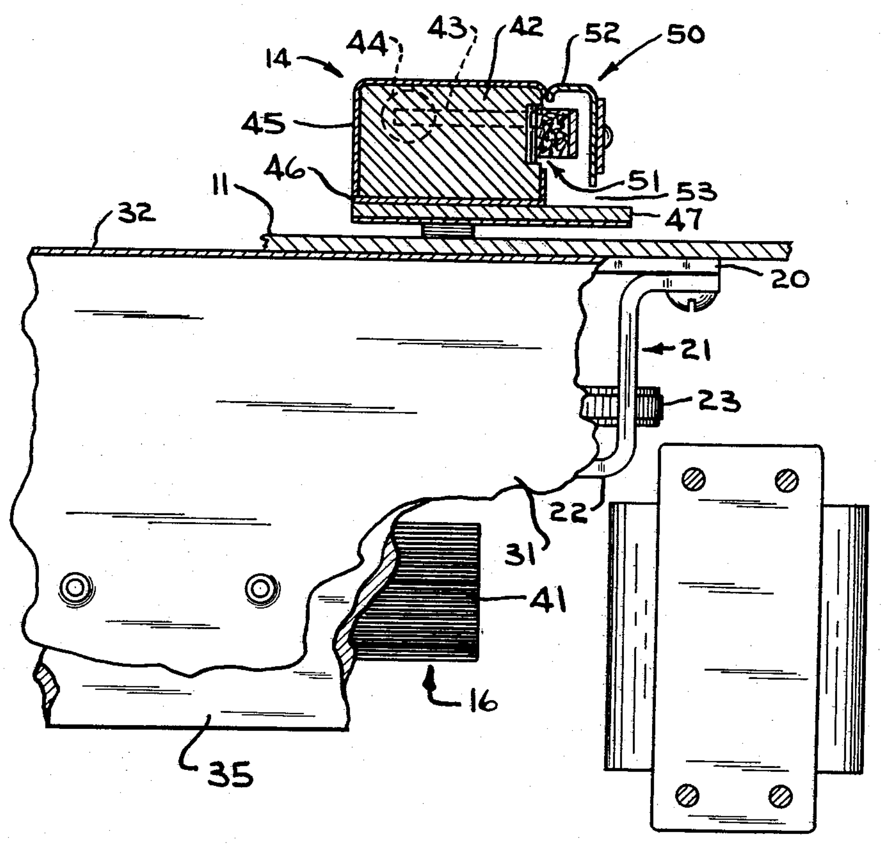
Figure 5 is a section on line 5—5 of Figure 2.

Referring now to Figures 3, 4, and 5, it will be seen that the amplifier chassis is mounted in the instrument casing, with its top wall 32 closely underlying cover plate 11. Cover plate 11 is of substantial thickness of the order of ⅛" and is made of a material of relatively high magnetic permeability, typically cold rolled steel. The top wall 32 of the chassis underlies the location of the magnetic head 14, and, with the section of the cover plate 11 that also underlies the head, it forms a laminated magnetic shield section of two laminations which respectively are of relatively low and relatively high magnetic permeability. The amplifier chassis, additionally, is so positioned relative to motor 16 and head 14 and with respect to the two right angularly related directions in which one is spaced from the other that the end wall 31 lies between the motor and the head in one of those directions of spacing. Thus, the end wall 31 of the chassis acts as a second low permeability shield element between the motor and the head. In order to increase the effectiveness of this shielding system, a shield plate 35 of material of relatively high magnetic permeability (such as cold rolled steel) is mounted on the end wall 31 of the amplifier chassis. This plate 35 is of a width to collect a substantial portion of the stray magnetic field that results from the saturation of the portions 36 of the motor core structure that are surrounded by the shading coils 37 and that become magnetically saturated due to the currents flowing in the shading coils. For convenience in shielding, motor 16 is mounted with its rotor gap 38 toward chassis wall 31, and plate 35 is provided with offbent end reaches 39 that partly encircle the periphery of the motor iron structure.

The effectiveness of the shielding interposed in the magnetic field path between the motor and the head, which is generally indicated by the dotted line 40 of Fig. 3, is increased by the spacing of the permeable shield plate 35 from the permeable motor core structure 41, and the spacing between chassis end wall 31, and top wall 32. These spacings provide air gaps that increase the shielding effectiveness of the structural parts. Additionally, the head 14 is mounted in spaced relation to cover plate 11, thereby providing an additional air gap in the magnetic field path. The head itself is arranged with a view to magnetic shielding. The head comprises an internal insulating body 42 that encloses the magnetic circuit element 43 and an electrical winding 44 that is linked with that element. Body 42 is enclosed in a magnetic shield of high permeability material comprising a can 45 and a closure plate 46. The head assembly is mounted on a pad element 47 of aluminum or similar low permeability material. This head arrangement and its mounting in spaced relation to cover plate 11 afford additional shielding against the magnetic path indicated by line 40 in Fig. 3.

A second general path of magnetic energy is indicated by line 48 of Fig. 3. This path extends from the motor gap generally in the direction of the spindle 28 and curves toward head 14. A shielding system of generally similar arrangement to that described above is provided by the motor plate 25, the supporting bracket plates 20, 22, and cover plate 11. Motor supporting plate 25 is made of material of relatively high magnetic permeability, as cold rolled steel, and is spaced both from the iron structure 41 of motor 16 and from bracket plate 22, thereby providing an air gap between adjacent laminations respectively of high and low magnetic permeability. A second air gap is provided between plate 22 and plate 20. Bracket plate 20 and cover plate 11 provide a second pair of laminations of low and high permeability material. The spacing between cover plate 11 and the head shield can 45 provides another air gap in the magnetic path 48. The head can provides a final shielding lamination which is of high permeability.

It will be seen that the physical relative arrangement of the structural elements of the reproducing instrument and the selection of materials of which they are made provide a peculiarly effective system for shielding the head from energization by stray fields of the two-pole induction motor. This system is arranged entirely of elements that are necessary for supporting devices such as motor 16 and chassis mounted electronic elements 49, with the single exception of the shielding plate 35. Thus, effective shielding is accomplished without material addition to the cost or to the weight of the instrument.

As shown in Figs. 4 and 5, an auxiliary head shield 50 may be provided. This shield is a substantially L-shaped plate that overlies the window 51 in the head shield can 45 through which the record body and magnetic circuit element are exposed to each other for magnetic coupling. The auxiliary shield 50 has one leg 52 that masks window 51 and that is spaced from the head to lie at the opposite side of a record body moving past the head. A second leg 52 of the shield extends across and beyond the path of the record body and contacts the head can 45. A gap is provided at 53 between pad element 47 and the edge of shield leg 52. This auxiliary head shield is fully disclosed and claimed in the application of Manuel L. Flata, Serial Number 194,823, filed November 9, 1950.

We claim:

1. In a device for reproducing a signal from a recording on a moving record body and including magnetic circuit means energizable by stray magnetic fields to produce a spurious signal component and which is supported in a preselected position, an amplifier having a box-like chassis of right angularly related walls of low magnetic permeability, and a two-pole shaded pole induction motor having a rotor for driving a record body and spaced from said magnetic circuit means in two right angularly related directions, a first of which is parallel to and the second of which extends radially relative the axis of rotation of said rotor; an arrangement shielding said magnetic circuit means from stray magnetic fields produced by said motor, comprising means mounting said chassis with a first one of its said walls spaced from said motor in said second direction and from said magnetic circuit means in both said directions and with a second one of its said walls extending from the first in said second direction and beyond said magnetic circuit means, said second wall lying along planes that extend between said motor and magnetic circuit means with respect to said first direction, a pair of plate members of high magnetic permeability interposed respectively between said first wall and motor and between said second wall and magnetic circuit means, and a second pair of plate elements respectively of high and low magnetic permeabilities mounted with their surfaces along planes that extend between said motor and magnetic circuit means in said first direction.

2. In a device for reproducing a signal from a recording on a moving record body and including magnetic circuit means energizable by stray magnetic fields to produce a spurious signal component, an amplifier having a box-like chassis of right angularly related walls of low magnetic permeability, and a two-pole shaded pole induction motor having a rotor for driving a record body; a mechanism supporting plate of highly magnetically permeable material, means supporting said magnetic circuit means in a preselected location to one side of said supporting plate, means supporting said motor in spaced relation to the second side of said plate with the rotation axis of said rotor at right angles to said plate and with said motor spaced from said magnetic circuit means in a direction extended radially relative to said axis, means mounting said amplifier chassis at said second plate side with a first one of its walls disposed at right angles to said supporting plate and along a plane that extends between said motor and magnetic circuit means and with a second one of its walls disposed parallel to said second plate surface and along a plane that extends between said motor and plate, a plate of high magnetic permeability secured to said first chassis wall between the latter and said motor, a bracket structure secured to said second supporting plate surface and comprising a bracket plate of low magnetic permeability interposed between said supporting plate and said motor, a motor plate of high magnetic permeability supported by said bracket plate and interposed between the latter and said motor, and means securing said motor to said motor plate.

3. In a magnetic recorder device including, magnetic transducing means, transducer operating amplifier and chassis means therefor, record body drive means, electric motor means for actuating said drive means and productive of a stray magnetic field, means for supporting and shielding the transducing means from said stray magnetic field comprising; mounting said transducing means upon a cover plate of high magnetic permeability, securing the amplifier chassis means from said cover plate in position under said transducing means, plate means of low magnetic permeability for supporting the record body drive means from said cover plate, motor mounting plate means of high magnetic permeability secured to the record body drive supporting plate means for support of the electric motor means; and the said cover, chassis, record drive supporting plate means and motor mounting plate being positioned in compact arrangement with respect to each other while additionally being operable to shield the transducer from relatively very strong stray magnetic motor fields.

4. In a magnetic recording instrument including, a supporting cover plate member of high magnetic permeability, magnetic transducer means for actuating a record body mounted on and spaced from said cover member, amplifier transducer operating means including a chassis, said chassis having wall means at least certain of which are of relatively low magnetic permeability including an upper wall affixed to said cover member to position the chassis beneath the transducer means, record body drive means including plate means comprising spaced plates of relatively low magnetic permeability upon and from which the drive means is supported and suspended by one of said plates from the said cover member for positioning adjacent to the amplifier chassis, electric motor means for actuating the drive means and productive of a stray magnetic field, an electric motor mounting plate of high magnetic permeability secured to and spaced from one of said record drive means supporting plates; and the said cover, chassis, record drive support plate means and motor mounting plate being positioned in compact arrangement with respect to each other while additionally being operable to shield the transducer from relatively very strong stray magnetic motor fields such as produced by a two-pole shaded pole induction motor.

5. In a device for reproducing a signal from a recording on a moving record body and including magnetic circuit means energizable by stray magnetic fields to produce a spurious signal component and which is supported in a preselected position and devices requiring support by plate-like structures and including a motor that produces a stray magnetic field extended in curving magnetic paths between itself and said magnetic circuit means; an arrangement shielding said magnetic circuit means from energization by said stray field, comprising disposition of plural of said plate-like structures of relatively high and low magnetic permeabilities in said magetic path and generally transverse relation to them, with spacings between adjacent ones of said structures and structures of high permeability intervening between structures of low permeability.

6. In a device for reproducing a signal from a recording on a moving record body and including magnetic circuit means energizable by stray magnetic fields to produce a spurious signal component and which is supported in a preselected position, a shield of high magnetic permeability enclosing said magnetic circuit means, devices requiring support and including a motor that produces a stray magnetic field extended in curving magnetic paths between itself and said magnetic circuit means; an arrangement shielding said magnetic circuit means from energization by said stray field, comprising disposition of a first of said structures of high magnetic permeability between said magnetic circuit means shielding and said motor and in spaced relation to both of them, and disposition of plural others of said structures to extend across said magnetic paths between said motor and first structure, the ones of said other structures closest to the motor being spaced from the latter and being of high magnetic permeability, and at least one of said other structures being disposed across each of said paths between said ones that are closest to the motor and said first structure and being spaced from both of the latter.

References Cited in the file of this patent

UNITED STATES PATENTS

| | | |
|---|---|---|
| 2,089,287 | Molloy | Aug. 10, 1937 |
| 2,277,305 | Clopton | Mar. 24, 1942 |
| 2,549,771 | Camras | Apr. 24, 1951 |

FOREIGN PATENTS

| | | |
|---|---|---|
| 365,483 | Great Britain | Jan. 21, 1932 |

OTHER REFERENCES

Magnetic Recording, Begun, page 107.

Ser. No. 298,171, Milde (A. P. C.), published May 18, 1943.